March 26, 1957 — A. A. REID — 2,786,511
METHOD AND APPARATUS FOR FORMING SEAMS OF THERMOPLASTIC MATERIAL
Filed July 5, 1952 — 4 Sheets-Sheet 1

INVENTOR
ALAN A. REID
BY William C. Stueber ATTORNEY

March 26, 1957 A. A. REID 2,786,511
METHOD AND APPARATUS FOR FORMING SEAMS
OF THERMOPLASTIC MATERIAL
Filed July 5, 1952 4 Sheets-Sheet 2
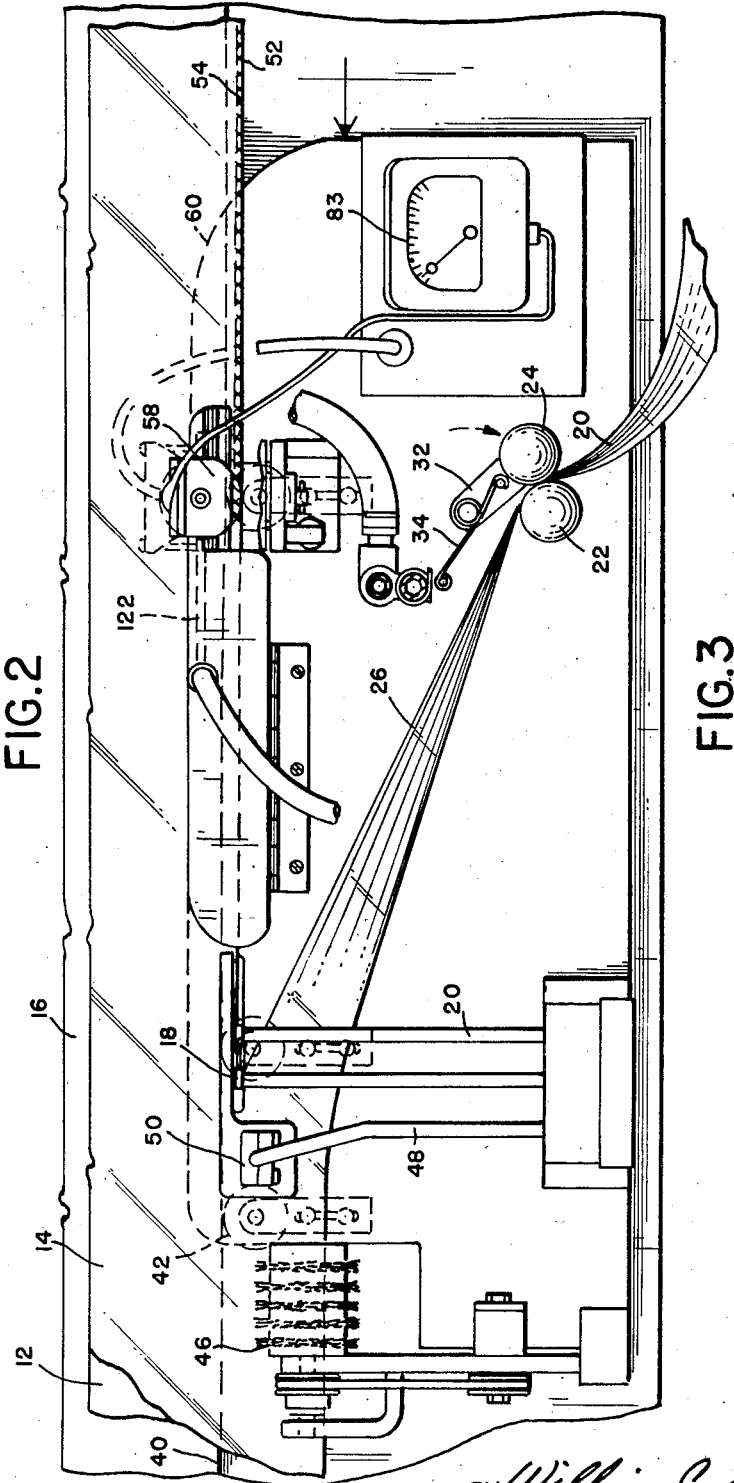
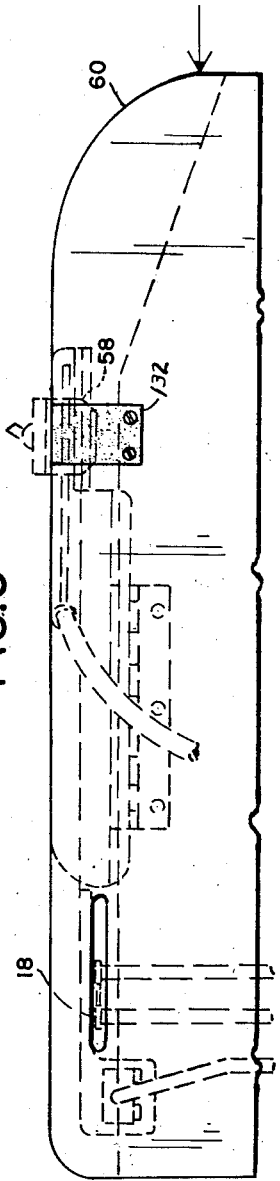
INVENTOR
ALAN A. REID
BY William C. Stucker ATTORNEY

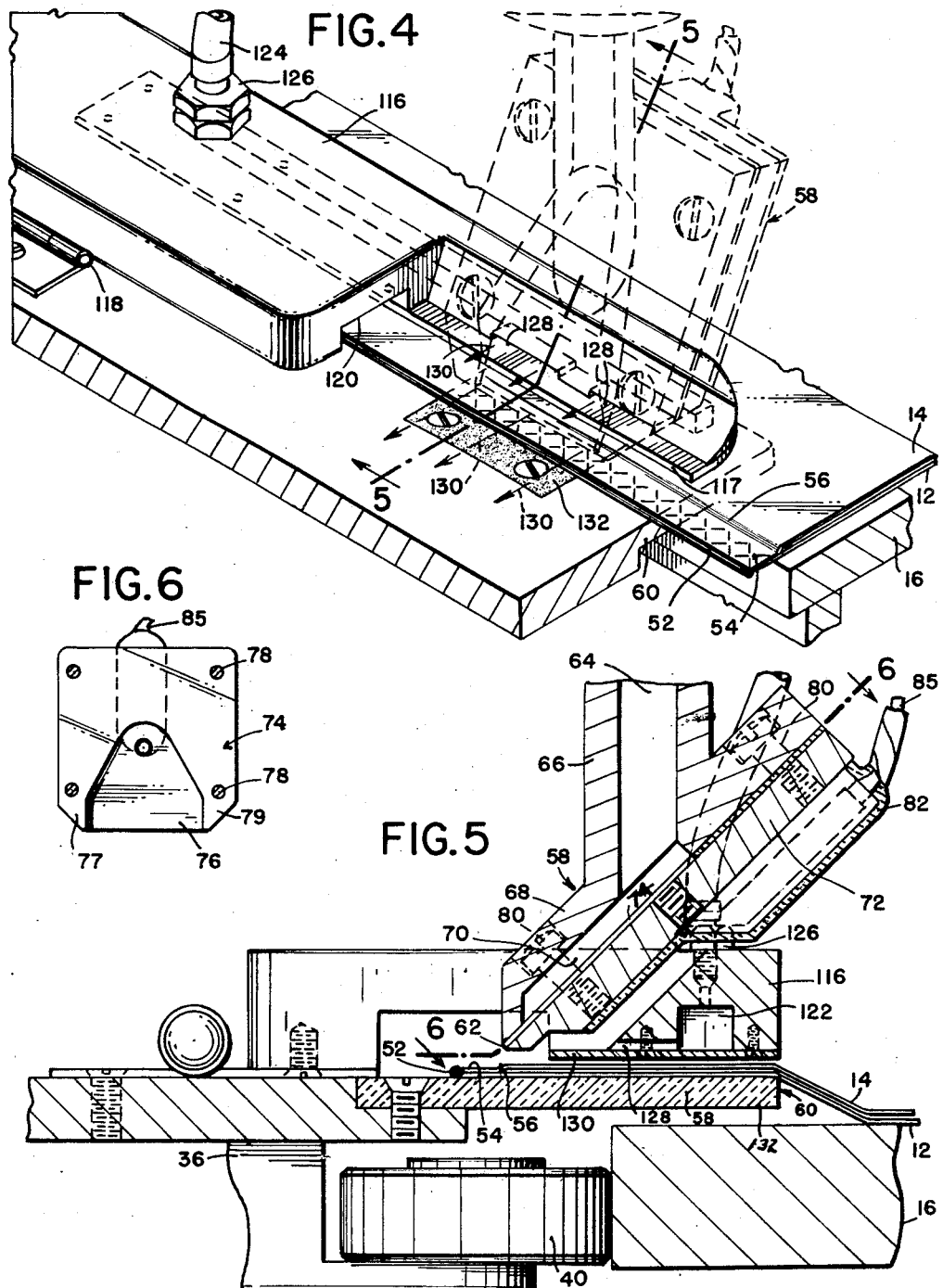

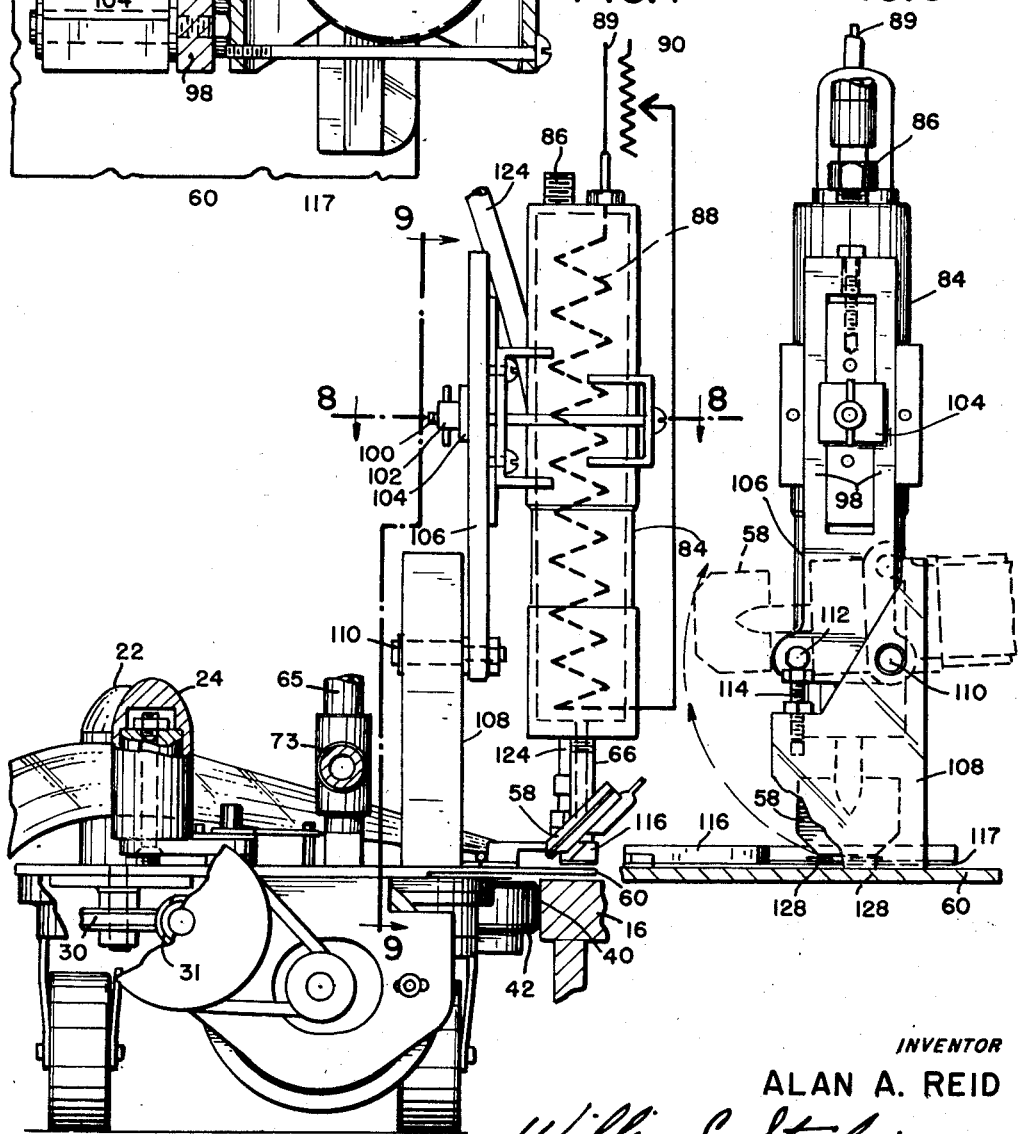

United States Patent Office 2,786,511
Patented Mar. 26, 1957

2,786,511

METHOD AND APPARATUS FOR FORMING SEAMS OF THERMOPLASTIC MATERIAL

Alan A. Reid, Minneapolis, Minn., assignor to General Mills, Inc., a corporation of Delaware Application July 5, 1952, Serial No. 297,335

11 Claims. (Cl. 154—42)

This invention relates to an improved method and a device for joining sheets of thermoplastic material by employing a flow of heated inert gas to form an improved seam.

An object of the invention is to provide a method and device which will form a long continuous seam between two thin sheets of thermoplastic material at a relatively high rate of speed.

Another object of the invention is to provide a device which will form a continuous seam between layers of juxtaposed thermoplastic sheets and which will form a broad seam which has an even and smooth edge so that when the layers are pulled away from each other there will be no points of concentrated strain.

Another object of the invention is to provide a device which will form a long continuous seam having a strength approaching that of the body of the material and forming the seam along the edge of sheets of thermoplastic material which have been previously cut-seamed.

Other objects and advantages will become more apparent in the following specification and claims taken in connection with the drawings, in which Fig. 1 is a side elevation of the mechanism for forming the seam between the layers of thermoplastic material;

Fig. 2 is a plan view of the seam forming mechanism;

Fig. 3 is a plan view illustrating the table on which the material slides;

Fig. 4 is a perspective view of the air jet which forms the broad seam on the material;

Fig. 5 is a sectional view taken along line 5—5 of Fig. 4;

Fig. 6 is a sectional view taken along line 6—6 of Fig. 5;

Fig. 7 is an elevational view taken from the rear of the seam forming machine;

Fig. 8 is a sectional view taken along line 8—8 of Fig. 7; and

Fig. 9 is a sectional view taken along line 9—9 of Fig. 7.

Figure 1:
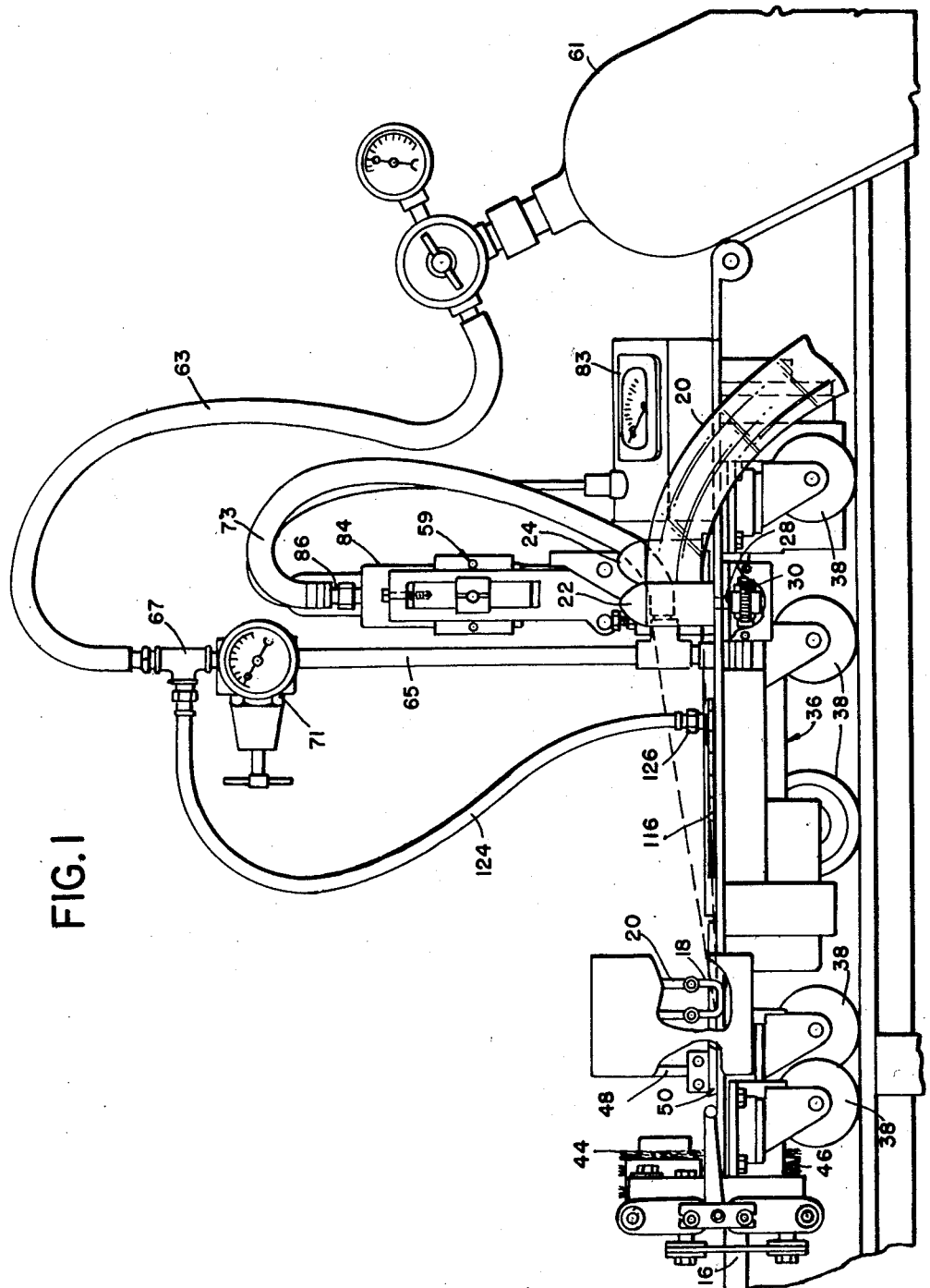

In the preferred embodiment shown in the drawings, two lengths of sheet thermoplastic material are to be joined together at their edges by a seam. The mechanism is capable of seaming various thermoplastic materials well known to the art. For purposes of description only polyethylene will be taken as an example. In thermoplastic material, such as polyethylene and many other types of sheet thermoplastic available commercially, the material is supplied in lengths on rolls and for many uses it is necessary to join a number of lengths along the edges to obtain a wider width. Often the edges are trimmed to a definite shape and when joined will form a three-dimensional object, e. g., containers, balloons, etc. To be able to withstand stress the seam must be absolutely smooth on the edge adjoining the body of the thermoplastic sheet. When the sheets are separated and pulled away from each other, small irregularities or scallops in the seam will form points of stress concentration and tear the material or cause the seam to fail. If the material is to be used in an article which must withstand stress, or be impervious to liquids or impervious to gases such as in the case of a balloon, it is highly important that the seam be as smooth and as strong as possible to avoid the development of points of leakage when the material is stressed. In joining the sheets, for economy and for rapid production, it is desirable that the seam be formed at a high rate of speed. Yet because of the demands of strength and impermeability the seam must be completely continuous with no gaps along its length. Thus the present invention forms a continuous seam, which is smooth and strongly bonded, and does it at high speeds.

Referring now to the drawings, the sheets of material 12 and 14 rest on a support 16, the upper sheet 14 overlying the sheet 12. In forming articles having a specific shape, it is necessary to trim the edges of the sheets. This is accomplished by a heated severing wire 18 (Figs. 1 to 3) which passes through the layers of material, the heat of the wire fusing the material along the desired path and simultaneously separating a strip 20 which is cut from the edge of the material by the wire. The strip is drawn between a pair of rollers 22 and 24 which remove it and keep the material taut so that it is more easily severed.

The rollers 22 and 24 rotate about a vertical axis drawing the material toward them. The material is shown placed between the rollers so that the inner edge 26 of the strip is toward the top and thus the greatest amount of tension is placed on that edge although its position is not critical.

The drive roller 22 is mounted upon a shaft 28, shown in Figs. 1 and 7. At the lower end of the shaft is a gear 30 which is driven by a worm 31 which rotates the rollers to draw the strip taut as it is severed from the sheets. Roller 24 pushes the strip against roller 22 and is free to rotate as the strip is drawn by roller 22. The roller 24 is rotatably mounted on a pivotal arm 32 which is biased by a spring 34 to hold the roller 24 against the roller 22. The tops of the rollers are rounded so that the severed strip 20 may easily be slipped between them by merely drawing the material down between the rollers.

The drive roller is geared so that its surface speed is about twice the traveling speed of the wire along the material so that the severed strip will continuously be drawn taut.

The heated wire 18 for cutting the strip from the edge of the sheets and the rollers for withdrawing the severed strip are mounted upon a vehicle or car 36 which travels along the edge of the thermoplastic material, cutting the material as it travels. The car is carried on a group of wheels 38 which are so positioned as to direct it in the proper path along the edge of the material. The supporting table 16 has a contoured edge 40 against which rides a guide wheel 42 on the vehicle. Certain of the wheels are turned to head the car toward the table and the car will then follow the edge of the supporting table to cut the material to the same shape as the edge 40.

A set of rotating brushes 44 and 46 are provided to draw the edge of the material outwardly so as to present a smooth surface to the severing wire 18. The severing wire is suitably carried on supporting arms 20 which are hingedly mounted on the vehicle to permit lifting of the severing wire from the material. Pivotally carried on the same mounting is an arm 48 carrying a presser foot 50 which flattens the material ahead of the cutting wire.

The heated severing wire will fuse the cut edges of the thermoplastic material together to form a bead 52 which welds together the sheets of material. This bead in itself, although forming a good seam, sometimes has minute openings which will destroy its air-tightness and may at times not be as smooth as would be desired for maximum strength. To obtain a seam that yields these qualities, a broad auxiliary seam 54 is formed just inside the bead. This seam is sufficiently broad so that no leaks could possibly be present and has a very smooth inner edge 56 which will eliminate points of stress concentration in the material when the sheets 12 and 14 are pulled away from each other.

To form this auxiliary seam a jet of heated inert gas is directed against the material in a unique manner. The inert gas may be air, nitrogen or other suitable gases and is heated to a degree sufficient to fuse the material but it is kept below the decomposition point of the material. The medium used for welding will be referred to as either air or gas. The term "inert" is used to indicate that the gas should be one which does not react adversely with the particular plastic material at the temperatures and pressures required to seam the material.

The jet of heated air is directed against the material by an elongated nozzle 58, shown in detail in Figs. 4, 5 and 6. The nozzle is carried along the material in a direction parallel to the elongation of the nozzle and the heated inert gas impinging on the edge of the material fuses it and forms a seam. Relatively high speeds have been found practical in forming the seam, although the accomplishments may vary with the thickness of material and other factors. The gas is directed against the material at relatively high pressure which serves two purposes: first, because of the high pressure considerable heat is transmitted to the material to cause it to fuse adequately; second, the high pressure air forces the upper layer 14 down tightly against the lower layer 12 to cause the two to join readily as soon as the thermoplastic is heated. Pressures may be used which will be found expendient for varying thickness of material, speed of travel of the machine and for the other factors involved.

As is seen in Fig. 5, the vehicle has a shelf which extends out over the table on which the material is supported, and the edge of the material slides along the surface of the shelf as the vehicle travels along the material. The jet nozzle is carried at the lower end of a supporting apparatus, shown generally at 59 and is supplied with pressurized air from a tank 61. The air is led from the tank through hose 63 which is connected to the pipe 65 by a fitting 67. The pipe carries a pressure gauge and control valve 71 by which the pressure of air supplied to the jet nozzle may be regulated. The air passes through pipe 65, and through the hose 73 which is connected to the air heating cylinder 84 by a connection 86 and the air passes from the cylinder out through the nozzle.

The jet of air, directed against the edge of the material by the nozzle, is directed at an angle to the material, the direction of the air forming an acute angle with the sheet of material and being directed away from the sheets and toward the bead at the edge.

The hot air, being directed at an angle against the material, impinges and deflects away to the left, as shown in Fig. 5. This prevents any of the hot air from softening the thermoplastic material to the right of the seam which might weaken the material or cause scallops along the edge of the seam. Thus a very straight seam is obtained since the point at which the air strikes the material is always clearly defined. The seam has no scallops along its edge which, when present in a seam, result in concentrated stress points at the peaks of the scallops when the sheets of material are pulled apart and stress is placed on the seam.

The nozzle for directing the air at the seam has its opening 62 at its lower tip where the air is expelled. The heated air enters the nozzle through a circular passageway 64 in its shank 66, Fig. 5. At the lower end of the shank is an integral hollow shoe portion 68 which has an air chamber 70. A lower plate 72 is secured against the integral shoe portion to close the chamber and to form the lower face of a jet opening 62. The width of the jet opening is determined by a shaped shim member 74, shown in detail in Fig. 6, formed of a flat piece of shim stock with the central portion 76 removed. The elongated jet opening appears in the space between the upper shoe 68 and the lower plate 72 and the opening between the ends 77 and 79 of the shim. The shim also has holes 78 through which pass the bolts 80 which hold the plate 72 against the upper shoe portion of the nozzle member.

Against the lower face of the plate is attached an element responsive to air temperature such as a thermocouple 82. The temperature is recorded on the meter 83 (Figs. 1 and 2) which is connected to the temperature responsive element by electrical leads 85 which permits either manual or automatic adjustment of the temperature of the air or inert gas.

It will be noted that the seam 54 is of considerable width, extending from its inner edge 56 to the bead 52. This obtains a strong seam and permits slight deviations of the position of the material with respect to the nozzle without encountering the danger of the seam becoming too narrow.

The nozzle is supported by its shank 66 on the lower end of the air heating cylinder or barrel 84 (Figs. 1 and 7). The inert gas or air enters the barrel under pressure from the hose 73 through the fitting 86 and passes down through the electric heating coils 88 contained within the barrel. The coils are supplied with electricity through wires 89 and the heat is controlled by the rheostat shown schematically at 90.

The barrel and nozzle are carried along the material by the car and the barrel is supported thereon by a clamp 92 (Fig. 8) which has a lug 94, the shoulders 96 of which abut against spaced vertical guides 98. The lug is pulled tight against the guides by an adjustable screw 100 having a tightening nut 102 which extends through the lug and has a washer 104 which presses against the back of the guides 98. By loosening the nut, the barrel assembly may be adjustably slid up and down to control the space between the air nozzle and the material.

The guide bars 98 are carried on a support 106 which is pivotally mounted on a post 108 carried on the vehicle. The support 106 is carried on the post by a pivotal pin 110 which permits the barrel assembly and supported air nozzle to be swung 90 degrees away from the material, from the solid line position of Fig. 9 to the dotted line position. Thus, when the vehicle is temporarily stopped, the air jet can be swung away from engagement with the material to prevent burning the seam at that point.

A pin 112 projecting from the support 106 strikes an adjustable setscrew 114 when the barrel is swung into seam-forming position to fix its vertical position. The pivot pin 110 is positioned eccentric to the barrel axis so that its weight will tend to keep it in vertical position when the seam is being formed and is positioned below its center of gravity so that it will tend to remain in horizontal position when swung away from the material.

To insure that the air is excluded from between the layers, a plate 116 is positioned against the upper layer of material. The plate does not frictionally retard the material but merely holds the upper layer down if it bulges up and the distance between the plate 116 and table 60 is slightly more than the combined thickness of the two layers of material. The plate is carried on a hinge 118 on the vehicle and may be swung up out of the way for withdrawal or replacement of the material. The plate is of a light weight material and the frictional support of the hinges and the stiffness of the air supply hose 124 prevent the plate from bearing heavily on the material. The plate has a groove or channel 120 through which the bead 52 slides to prevent smearing or deforming of the bead while warm.

A second channel 122 (Figs. 2, 4, and 5) is cut in the plate 116 and is supplied with pressurized cool air through the supply hose 124 connected to the plate by a fitting 126. As illustrated in Fig. 1 the hose 124 derives its air from the supply tank 61 and is connected to the supply line 63 by the fitting 67.

The channel 122 exhausts cool air through a pair of long openings 128 which direct streams of cool air across the face of the material, as indicated by the arrows 130 of Fig. 4. This stream of cool air flows across the material at the edge of the seam 56 and aids in keeping the material cool adjacent the seam.

Principally the flow of cool air is passed over the thin portion 130 of the plate 116, to keep it cool and prevent it from burning holes in the material. The plate 116 is preferably made of a light weight metal or a fiber material and may heat to a degree where it may damage the material or itself and this is prevented by the cool air.

The table 60 is generally formed of metal such as aluminum which rapidly conducts heat away from any locally heated area. The cool metal beneath the seam, where it is engaged by the heated air, will normally make the jet less effective. To combat this an insert 132 of fiber or other material having low heat conductivity is placed in the table flush with the surface beneath the jet. Thus the heat is not conducted away from the lower layer of material and the complete fusion of the material to form the seam is insured.

The thermoplastic material, being engaged by the elongated jet of air directed from the elongated nozzle at any given moment receives heat along an elongated area. This permits the gas to adequately heat the material to cause fusion even though the jet is traveling over the material at a relatively high rate of speed. The machine is thus capable of forming a long continuous seam at a rapid rate without danger of missing areas due to receiving insufficient heat.

The jet of air being directed at the material at an angle is largely deflected away from the material after it forms the seam so that only the seam area is heated and so that a straight-edged seam is formed. The straightness of this seam is improved by the cool air which is deflected substantially parallel to the material to meet the heated jet at the point where the edge of the seam is to be formed.

The seam forming mechanism is capable of forming a seam between multiple layers of material and may be used in various adaptations. The combination of the heated wire and the heated air jet permits forming gas impervious seams of any shape and the combined seam formed by the bead of the heated wire and the flattened seam of the air jet presents a firm, tight seam, the strength of which approaches the strength of the material.

The air jet may be adapted for use to form a seam spaced from the edges of the material. Thus two sheets of material will be joined by a seam at a mid point leaving each of the sheets intact and also leaving the layers unattached at each side of the seam.

I have, in the drawings and specification, presented a detailed disclosure of the preferred embodiments of my invention, but it is to be understood that as the invention is susceptible of modifications, structural changes and various applications of use within the spirit and scope of the invention, I do not intend to limit the invention to the specific form disclosed but intend to cover all modifications, changes and alternative constructions and methods falling within the scope of the principles taught by my invention.

I claim as my invention:

1. An apparatus for forming a seam to join layers of thermoplastic material comprising a heated wire for cutting layers of material and seaming together the severed edges, a jet directing heated inert gas against the material forming an additional seam in the material and positioned behind the wire and offset from the first seam, and means to give the wire and jet relative movement with respect to the material to form a continuous elongated seam between the layers of material.

2. An apparatus for forming a seam to join the free edges of superimposed layers of thermoplastic material comprising a table for supporting layers of thermoplastic material, a nozzle directing a jet of heated inert gas against the outer layer of material to force the layers together and fuse the thermoplastic to form a seam, means for supplying heated and pressurized gas to said nozzle, means for moving the nozzle relative to the material to form a continuous elongated seam, and means providing a jet of cool air directed across the surface of the material at the point where the heated air impinges against the material, said last mentioned means directing the cool air jet at the side of said elongated seam farthest from said free edges of the layers and in a direction across the material toward the jet of heated gas and toward said free edges to form a clearly defined line where the fused seam ends.

3. An apparatus for forming a seam to join the free edges of superimposed layers of thermosplastic material comprising a support for layers of material, an elongated nozzle directed against the outer layer of material and supplied with pressurized heated gas to force the layers of material together and form an elongated seam, means for moving the material relative to the nozzle in the direction of its elongation to form a continuous seam, and means providing an elongated source of cooling inert gas directed across the jet of heated inert gas at the point where it engages the material said last mentioned means directing the cool air jet at the side of said elongated seam farthest from said free edges of the layers and in a direction across the material toward the jet of heated gas and toward said free edges to help form a straight unscalloped seam.

4. An apparatus for forming a seam to join layers of thermoplastic material comprising a table for supporting layers of material, an elongated nozzle positioned to direct a jet of heated pressurized inert gas against the upper layer of material and at an angle thereto so that the inert gas impinges against the material and is deflected from the material in one direction, a guide plate positioned above the material adjacent the nozzle to insure that the layers will remain together, and a supply of cooling inert gas directed across the plate to prevent its heating and burning the material, and means for moving the nozzle and cool inert gas supply along the material in a direction at right angles to the inert gas flow to form a continuous elongated seam.

5. Apparatus for forming a uniform, gas-tight, stress-resistant seam between layers of thermoplastic material comprising first means for cutting the layers along a desired path and fusing together the newly cut edges to form a first seam, second means directing heated inert gas against the material immediately adjacent the first seam and thereby forming a second seam offset from the first seam, and third means for giving said cutting and fusing means and said gas directing means rapid relative movement with respect to the material in a direction along said path.

6. Apparatus accordng to claim 5 having means directing a stream of cooling gas across the material immediately adjacent the second seam on the side opposite said first seam.

7. Apparatus according to claim 5 having a guide plate engaging the material adjacent the region in which the heated gas strikes the material, said guide plate being located at the side of said second seam opposite the first seam, and means directing a stream of cooling gas across said guide plate toward said second seam.

8. The method of forming a uniform, gas-tight, stress-resistant seam between two sheets of thermoplastic material which comprises superimposing the sheets in face to face relation in a given plane, causing relative movement of a heated cutting member along a desired path in said plane and thereby severing the material and fusing together the newly cut edges of said sheets along said path, directing a stream of heated gas against the sheets immediately adjacent said fused edges, and causing relative movement of said sheets across said stream in a direction extending along said path.

9. The method of forming a uniform, gas-tight, stress-resistant seam between two sheets of thermoplastic material which comprises superimposing the sheets in face to face relation in a given plane, severing the material and fusing together the newly cut edges of said sheets along a desired path in said plane, providing a sheet-like stream of moving heated gas having a thin elongated cross section perpendicular to its direction of movement, and directing said stream of heated gas at the superimposed sheets immediately adjacent said fused edges, with the thin elongated cross section of the stream substantially parallel to said path, the temperature and velocity of said stream of gas being adapted to fuse the sheets together along an area adjacent said fused edges.

10. The method of claim 9 including the further step of causing rapid relative movement of said sheets across said stream in a direction extending along said path.

11. The method of claim 10 in which the direction of movement of the heated gas stream also makes an acute angle with the plane of said sheets with the gas stream moving generally in a direction from the main portion of said sheets toward said fused edges.

References Cited in the file of this patent

UNITED STATES PATENTS

| | | |
|---|---|---|
| 2,405,675 | Southwick et al. | Aug. 13, 1946 |
| 2,407,495 | High et al. | Sept. 10, 1946 |
| 2,423,237 | Haslacher | July 1, 1947 |
| 2,453,889 | Bojanower | Nov. 16, 1948 |
| 2,459,235 | Hewitt et al. | Jan. 18, 1949 |
| 2,535,029 | Atanasoff et al. | Dec. 26, 1950 |
| 2,546,164 | Norris | Mar. 27, 1951 |
| 2,678,679 | Bergstein | May 18, 1954 |
| 2,726,706 | Hakomaki | Dec. 13, 1955 |